(12) United States Patent
Greene

(10) Patent No.: US 7,762,384 B1
(45) Date of Patent: Jul. 27, 2010

(54) CONVEYOR SYSTEM

(76) Inventor: Harold R. Greene, 115 Cayuga Trail, Lake Kiowa, TX (US) 76240

( * ) Notice: Subject to any disclaimer, the term of this patent is extended or adjusted under 35 U.S.C. 154(b) by 0 days.

(21) Appl. No.: 12/401,366

(22) Filed: Mar. 10, 2009

Related U.S. Application Data

(63) Continuation-in-part of application No. 11/811,134, filed on Jun. 8, 2007, now Pat. No. 7,500,551.

(51) Int. Cl.
  *B65G 17/00* (2006.01)
(52) U.S. Cl. .......... 198/475.1; 198/797; 198/800
(58) Field of Classification Search ............ 198/475.1, 198/797, 798, 800
  See application file for complete search history.

(56) References Cited

U.S. PATENT DOCUMENTS

| | | | |
|---|---|---|---|
| 2,195,326 A * | 3/1940 | Crawford et al. ............ | 198/798 |
| 2,493,857 A * | 1/1950 | Cargill ....................... | 198/798 |
| 2,893,538 A * | 7/1959 | Buttironi et al. ............ | 198/795 |
| 3,326,355 A | 6/1967 | Phillips | |
| 3,575,281 A | 4/1971 | Sutton | |
| 4,465,177 A | 8/1984 | Dorner | |
| 4,957,188 A | 9/1990 | Bavis | |
| 5,054,605 A | 10/1991 | Bavis | |
| 5,113,970 A | 5/1992 | Bavis | |
| 5,361,891 A | 11/1994 | Greene et al. | |
| 5,791,451 A | 8/1998 | Brown | |
| 6,196,377 B1 | 3/2001 | Brown | |
| 6,554,105 B2 | 4/2003 | Brown et al. | |
| 7,059,465 B2 | 6/2006 | Chan | |
| 7,500,551 B1 * | 3/2009 | Greene ................. | 198/475.1 |
| 7,537,100 B2 * | 5/2009 | Mustahti et al. .......... | 198/321 |

* cited by examiner

*Primary Examiner*—Mark A Deuble
(74) *Attorney, Agent, or Firm*—James E. Walton

(57) ABSTRACT

A conveyor system has a pair of outer wheel tracks and a pair of inner wheel tracks, the wheel tracks of each pair being spaced from each other and extending parallel to each other. Each wheel track has at least one generally vertical portion and at least one generally horizontal portion. A conveyor member has two pairs of wheels, the wheels of each pair being located on opposite sides of the member, each pair of wheels engaging one pair of wheel tracks; the wheels and tracks are configured and oriented relative to each other so that the member is maintained in a selected orientation as the member moves relative to and along the tracks. The conveyor system includes a lift subsystem for preventing slippage of the conveyor member as the conveyor member travels around a curved portion of the conveyor system.

13 Claims, 15 Drawing Sheets

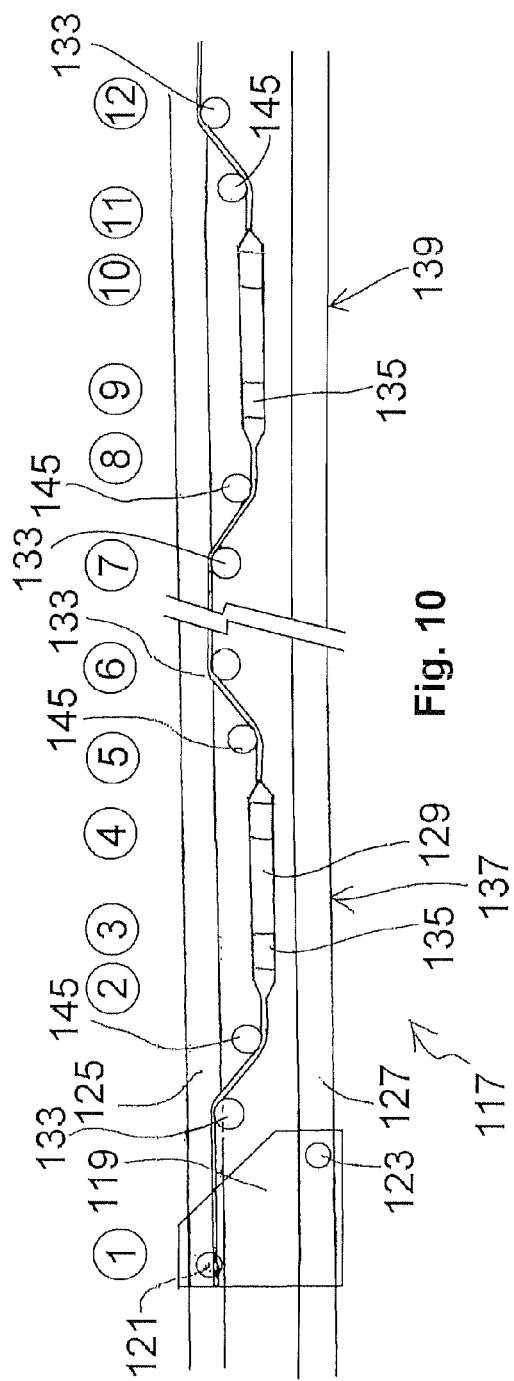
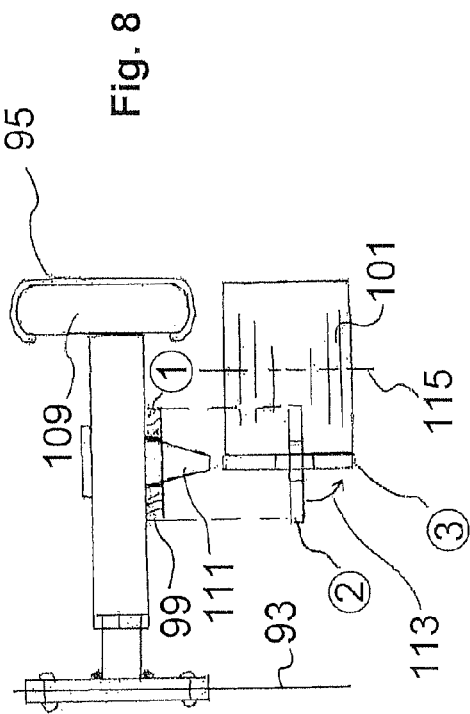

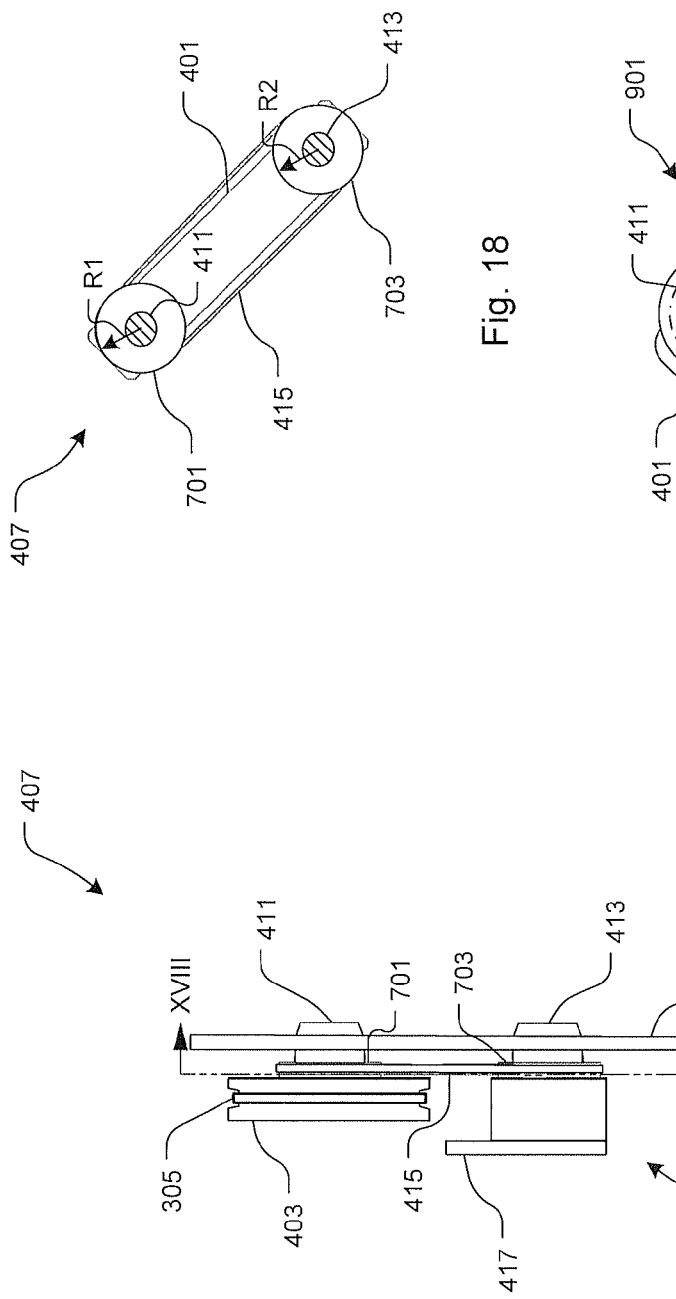
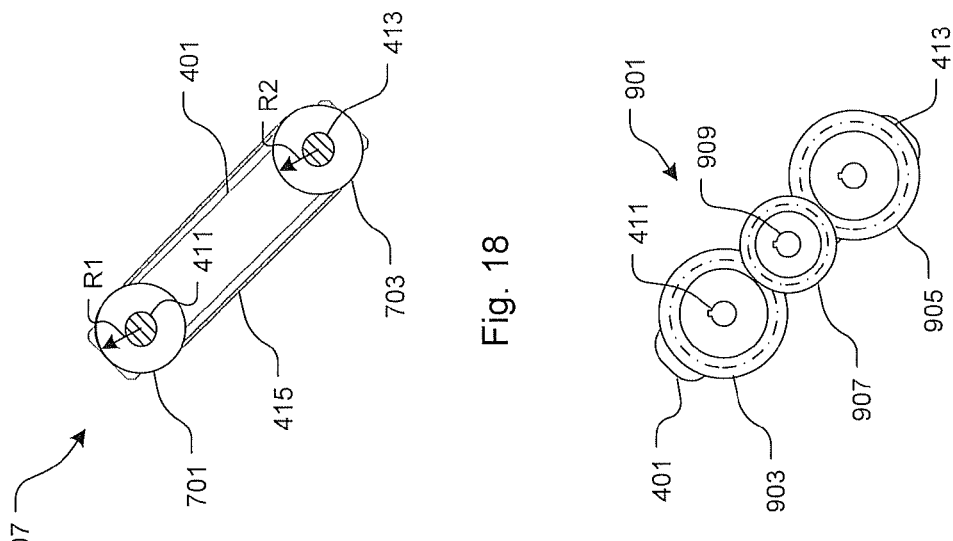
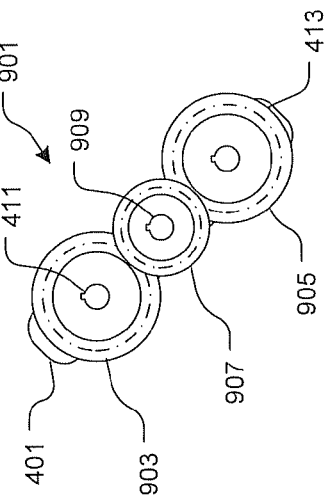
Fig. 18
Fig. 19
Fig. 17

CONVEYOR SYSTEM

CROSS REFERENCE TO RELATED APPLICATIONS

This application is a continuation-in-part of U.S. application Ser. No. 11/811,134, filed 8 Jun. 2007, titled "Conveyor System," which is hereby incorporated by reference for all purposes as if fully set forth herein, which claims the benefit of U.S. Provisional Application No. 60/812,535, filed 9 Jun. 2006, titled "Conveyor System," which is hereby incorporated by reference for all purposes as if fully set forth herein.

BACKGROUND

1. Technical Field

The technical field is conveyor systems.

2. Description of the Prior Art

Conveyor systems are used to move objects from one station to another. The stations may be located at the termination points at the beginning and end of the system or may be located at points between the termination points. Conveyor systems have any number of stations, and the systems may be configured to deliver objects to some or all of the stations during operation of the systems.

A typical conveyor system has a conveyor member, which may be, for example, a belt, tray, or box. Objects to be moved are placed in or on the conveyor member, which is propelled by a drive system, such as an electric drive system. The drive system is connected to the conveyor member directly or by means of at least one torque transfer device, such as a tape, a belt, a chain, or a set of gears.

BRIEF DESCRIPTION OF THE DRAWINGS

For a more complete understanding of the present application, including its features and advantages, reference is now made to the detailed description of the invention taken in conjunction with the accompanying drawings in which like numerals identify like parts, and in which:

FIG. 8 is an end view of a portion of the conveyor system of FIG. 7;

FIG. 10 is a schematic side view of a portion of the conveyor system of FIG. 9;

FIG. 17 is a front view of an actuator subsystem of the lift subsystem of FIG. 14A;

FIG. 18 is a cross-sectional view of the actuator subsystem of FIG. 17 taken at XVIII-XVIII; and FIG. 19 is a side view of an actuator subsystem according to an alternative embodiment of the present application.

DETAILED DESCRIPTION OF THE PREFERRED EMBODIMENT

A reversible, multi-plane conveyor system has a wheeled conveyor member, such as a box or platform, propelled by at least one tape along wheel tracks. The conveyor member can travel horizontally and vertically and can be configured to provide curved paths. The system is preferably powered by at least one motor. In a preferred embodiment, the conveyor member travels between two end points and may be stopped at intermediate locations along the travel path. The system design also contemplates the use of multiple stations, similar to a dumbwaiter providing service emanating from a base station to one or several substations. The stations can be arranged on one floor or multiple floors.

Figure 1:
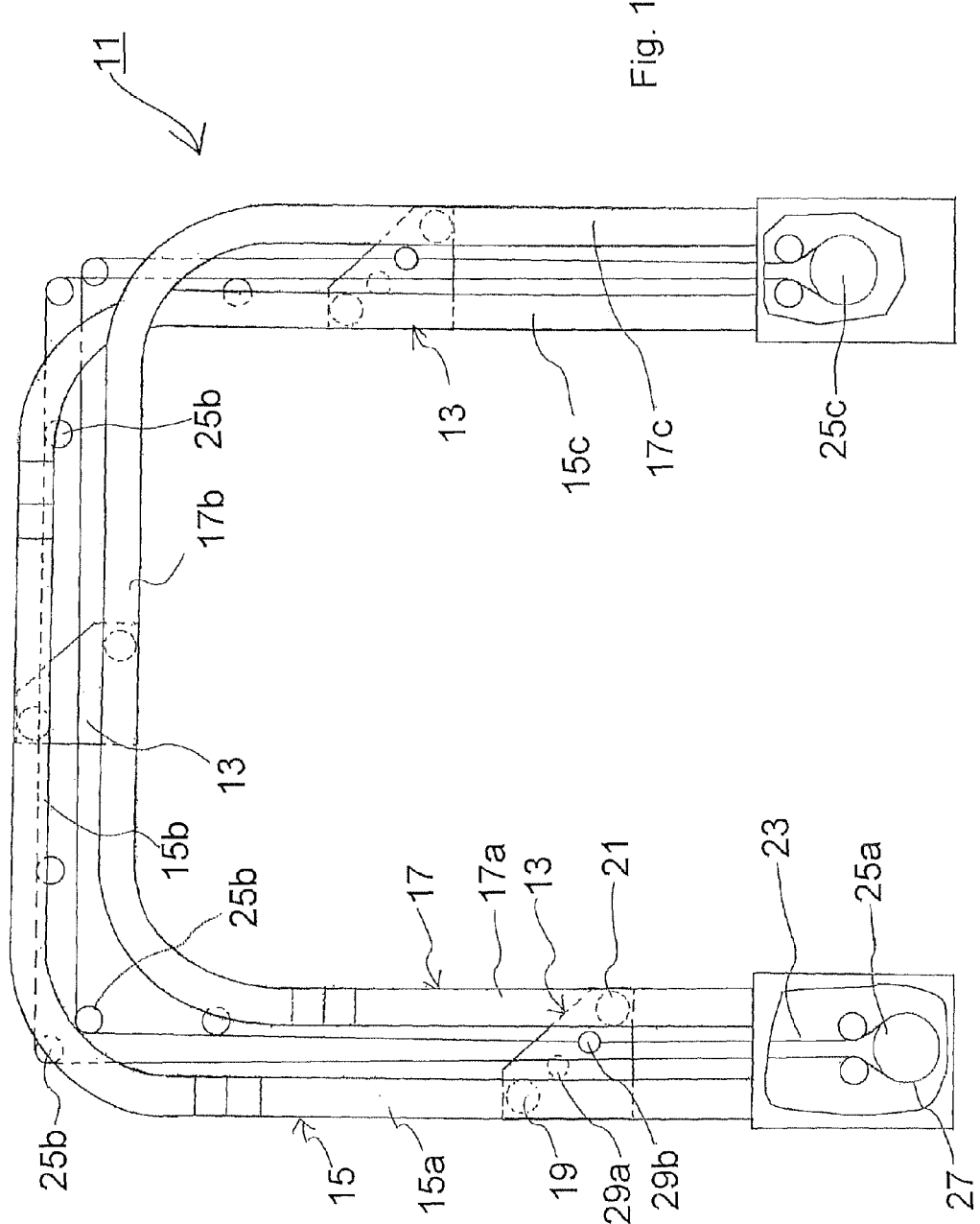
FIG. 1 is a schematic side view of a conveyor system.
Figure 2:
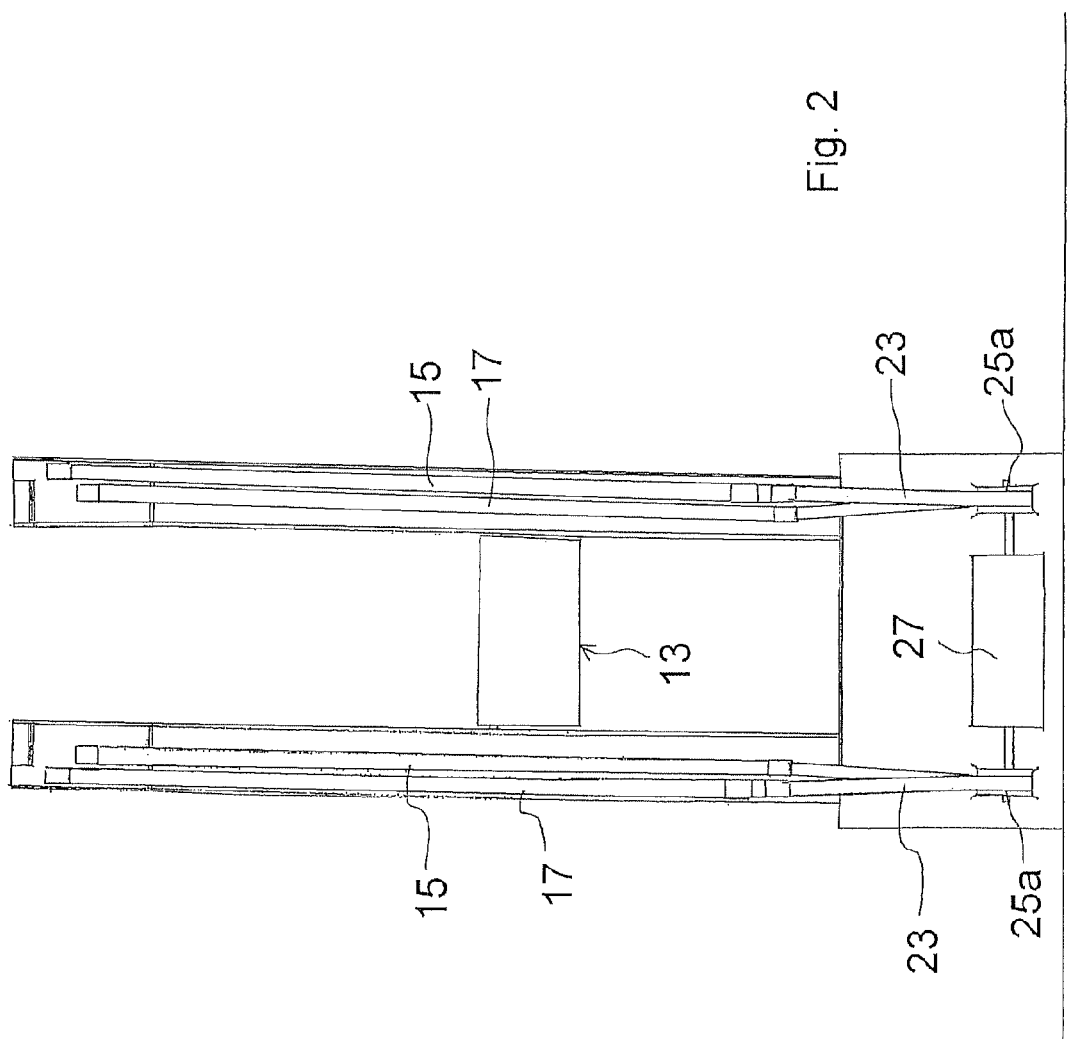
FIG. 2 is a schematic end view of the system of FIG. 1.

FIGS. 1 and 2 show a conveyor system 11 having a transport box 13, a pair of outer wheel tracks 15, and a pair of inner wheel tracks 17. Box 13 acts as the conveyor member and may be a box having vertical sides, as shown, or may be configured to have other shapes, such as a tray. Box 13 has a pair of upper wheels 19 and a pair of lower wheels 21, the wheels of each pair being located on opposite sides of box 13. In the embodiment shown, upper wheels 19 are located above and behind lower wheels 21, which are located on a lower portion near the front of box 13. Upper wheels 19 are configured for engaging outer tracks 15, and lower wheels 21 are configured for engaging inner tracks 17, wheels 19, 21 rolling within the corresponding tracks 15, 17 and guided along a travel path.

Each outer track 15 comprises a first vertical portion 15a, a horizontal portion 15b, and a second vertical portion 15c. Likewise, inner track 17 comprises a first vertical portion 17a, a horizontal portion 17b, and a second vertical portion 17c. Tracks 15, 17 preferably have a "C"-shaped cross-section, such as the tracks commonly used for overhead doors, for retaining and guiding wheels 19, 21 within their respective track 15, 17. In the embodiment shown, tracks 15, 17 are configured and oriented such that portions 17a are laterally spaced ahead of portions 15a, portions 17b are spaced below portions 15b, and portions 17c are spaced ahead of portions 15c. This relative orientation ensures that box 13 maintains a selected angular orientation about horizontal axes as box 13 is guided along the travel path.

Each of a pair of continuous loops of conveyor tape 23 is arranged in a tape path that generally coincides with the travel path of box 13 as box 13 moves from one end of tracks 15, 17 to the other end of tracks 15, 17. The tape path is defined by a motor pulley 25a, a plurality of intermediate pulleys 25b (only some are labeled), and a return pulley 25c. Tape 23 is propelled along the travel path by motor 27, which turns motor pulley 25a. Tape 23 is connected to box 13 at connectors 29a, 29b, such that box 13 is propelled along the travel path when motor 27 is operated. Tape 23 may be a solid or perforated tape or belt or may be any other appropriate type for use with box 13.

In operation, items are placed within box 13 at one end station, and then motor 27 is operated to rotate motor pulley 25a in a one direction. This moves each tape 23 along its tape path, which moves box 13 along its travel path toward the other end station. Wheels 19, 21 roll within the corresponding wheel tracks 15, 17, guiding box 13 and maintaining box 13 in a selected angular orientation about horizontal axes passing through box 13. Box 13 is then sent back to the original end station by reversing the direction or rotation of motor pulley 25a. It should be noted that the travel path of box 13 can be extended at the end of wheel tracks 15, 17 to provide for additional horizontal travel.

Figure 3:
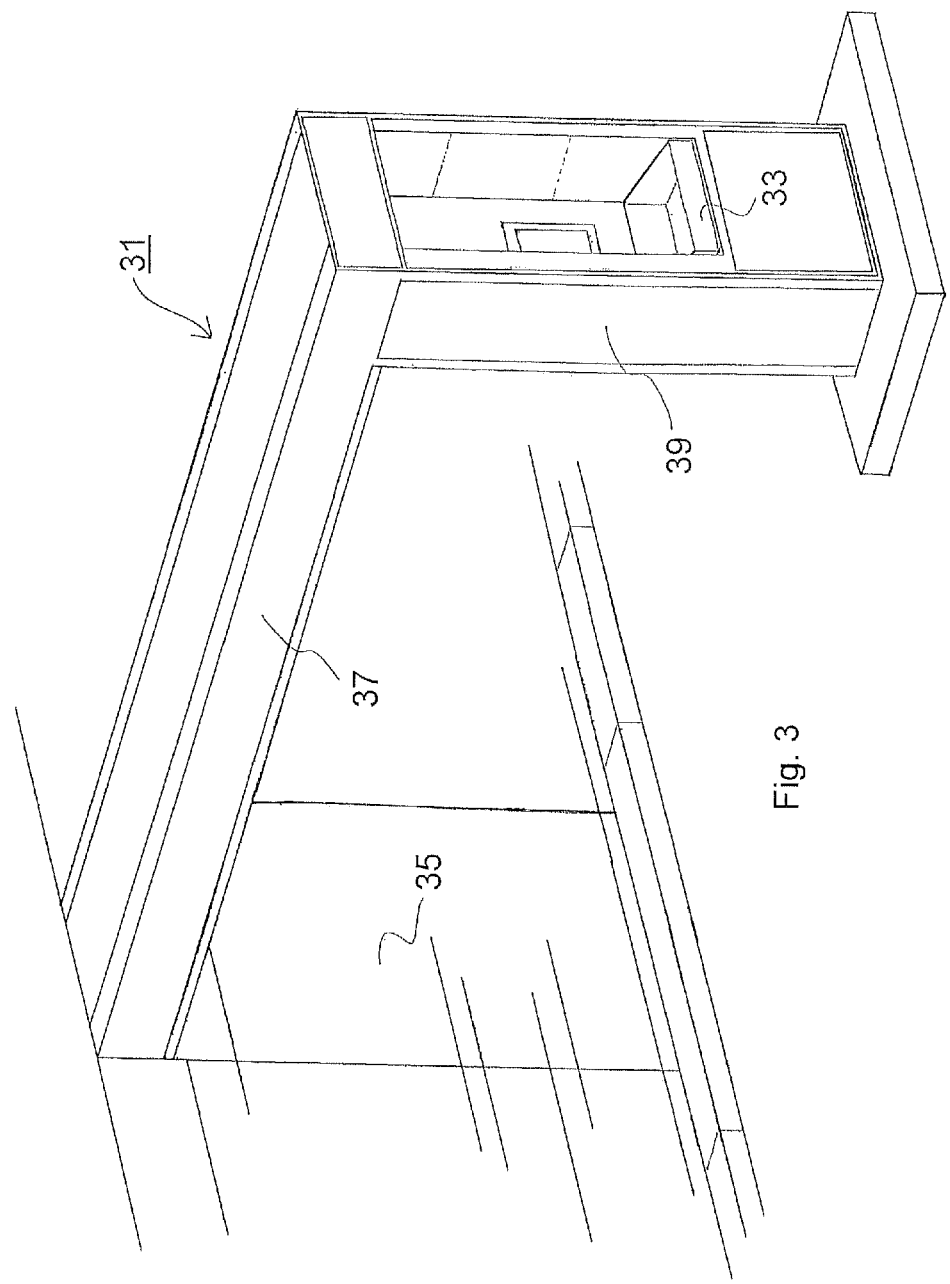
FIG. 3 is an oblique view of a portion of another embodiment of a conveyor system.

FIG. 3 shows a portion of another embodiment of a conveyor system 31, which is constructed in a similar configuration as conveyor system 11. System 31 is configured to move box 33 between a position within building 35, across elevated horizontal portion 37, and down within vertical portion 39 to an end station. While box 33 travels along the travel path, system 31 maintains box 33 in a selected angular orientation about horizontal axes using components similar to those described above. As shown, system 31 may be used, for example, to move items to and from customers in a "drive-through" lane of a bank, restaurant, or similar establishment.

Figure 4:
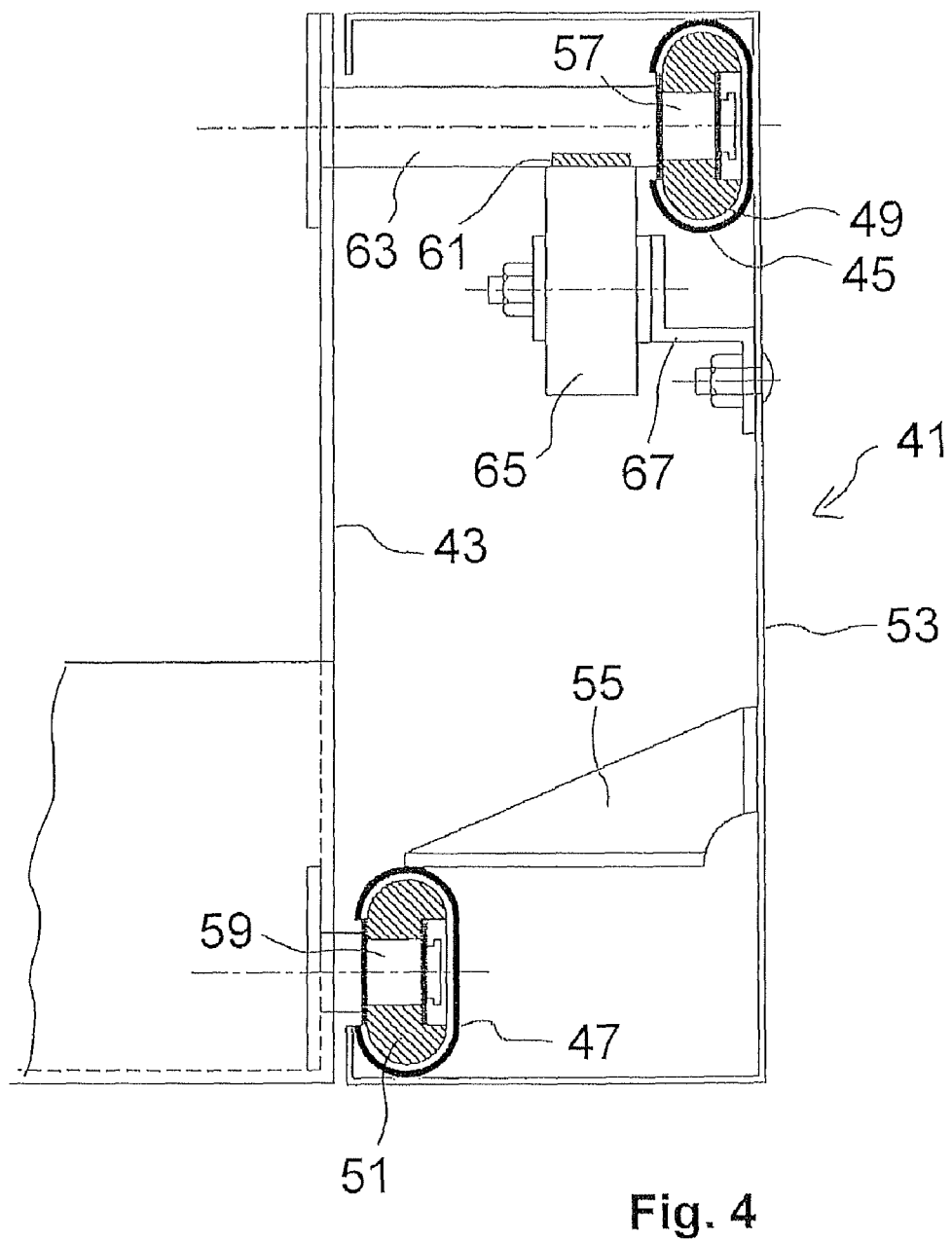
FIG. 4 is a schematic cross-sectional end view of a portion of another embodiment of a conveyor system.
Figure 5:
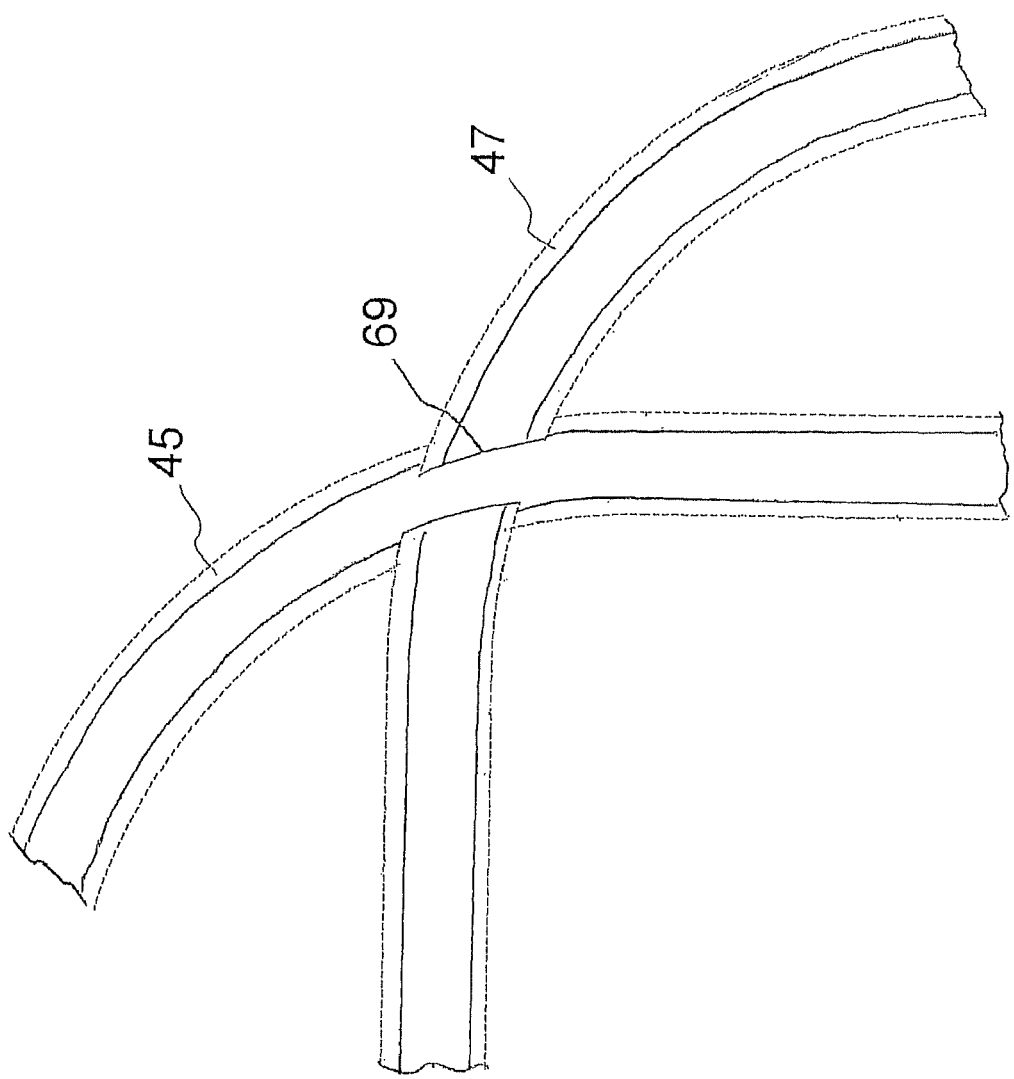
FIG. 5 is a schematic side view of a portion of the system of FIG. 4.

FIGS. 4 and 5 show portions of another embodiment of a conveyor system. FIG. 4 is a schematic cross-sectional end view of a portion of the system, and FIG. 5 is a schematic side view of a portion of the system. System 41 comprises a transport box 43, a pair of outer wheel tracks 45, and a pair of inner wheel tracks 47. Tracks 45, 47 are constructed similarly to tracks 15, 17 described above. Only one side of system 41 is shown in the view, so only one outer track 45 and one inner track 47 are visible. The view shows one of a pair of upper wheels 49 engaging one of outer tracks 45 and shows one of a pair of lower wheels 51 engaging one of inner tracks 47. Outer track 45 is directly attached to a sidewall 53 of system 41, and inner track 47 is attached to sidewall 53 with a bracket 55, which secures inner track 51 in a desired position and spaces inner track 51 from sidewall 53. Each upper wheel 49 is rotatably attached to box 43 with an axle 57, and each lower wheel 51 is rotatably attached to box 43 with an axle 59.

In the embodiment of FIGS. 4 and 5, box 43 is propelled using a tape 61 that engages a rotatable sleeve 63, which is carried on axle 57. Tape 61 is in constant engagement with sleeve 63, and sleeve 63 rotates to allow for the change in orientation between tape 61 and box 43 as box 43 moves from between vertical and horizontal portions of tracks 45, 47 during operation of system 41. Tape 61 may be attached to sleeve 63 using any appropriate means, such as mechanical fasteners, friction means, or adhesive means. An intermediate pulley 65 is mounted to sidewall 53 with a bracket 67, such that pulley 65 is positioned to support tape 61 along the tape path.

FIG. 5 shows a schematic view of the configuration of tracks 45, 47. A slot 69 is formed in inner track 47 to allow for axle 57 and sleeve 63 to pass through track 47, slot 69 having a width slightly larger than the diameter of sleeve 63. While it is preferable that slot 69 is formed in a horizontal portion of track 47, the location of slot 69 will be determined primarily by the relative spacing of wheels 49, 51 on box 43.

Figure 6:
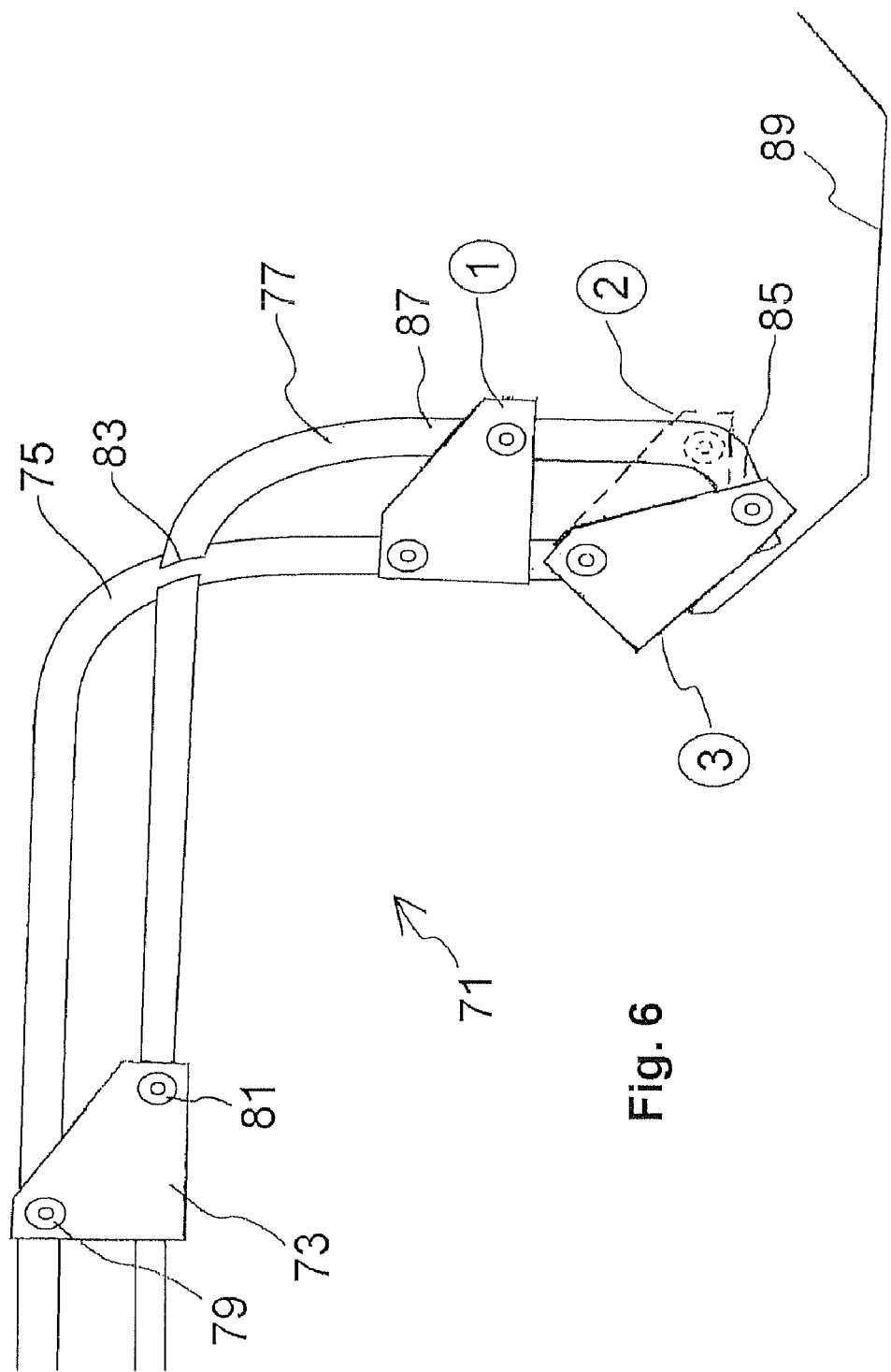
FIG. 6 is a schematic side view of a portion of another embodiment of a conveyor system.

FIG. 6 is a schematic side view of a portion of another embodiment of a conveyor system. System 71 comprises a transport box 73, a pair of outer wheel tracks 75, and a pair of inner wheel tracks 77. For ease of viewing, system 71 is shown with one track 75, 77 of each pair removed. Upper wheels 79 on each side of box 73 engage outer tracks 75, and lower wheels on each side of box 81 engage inner tracks 77. Tracks 75, 77 are formed to have a similar configuration as those described above, and each inner track 77 is formed to have a slot for the axle (not shown) of one of upper wheels 79 to pass through. Each Inner track 77 also has an additional dumping section 85 at the lower end of vertical section 87, dumping section 85 comprising an angled portion that is not present on outer tracks 75. Dumping sections 85 cause transport box 73 to move from a generally horizontal position, which is maintained throughout the travel along the remainder of tracks 75, 77, into a dumping orientation, in which box tilts to empty the contents onto surface 89. During operation, if box is moving downward toward surface 89, box 73 moves from position 1 to position 2 (shown in broken lines), and in each of these positions box 73 is maintained in a horizontal orientation. However, as lower wheels 81 encounter dumping sections 85 of tracks 77, box 73 moves to position 3, in which objects within box 73 may be dumped onto surface 89. Box 73 is returned to a horizontal orientation by reversing the motion of box 73, so that lower wheels 81 move back into vertical sections 87. If dumping is not desired, box 73 may be stopped in a position prior to lower wheels entering dumping sections 85.

Figure 7:
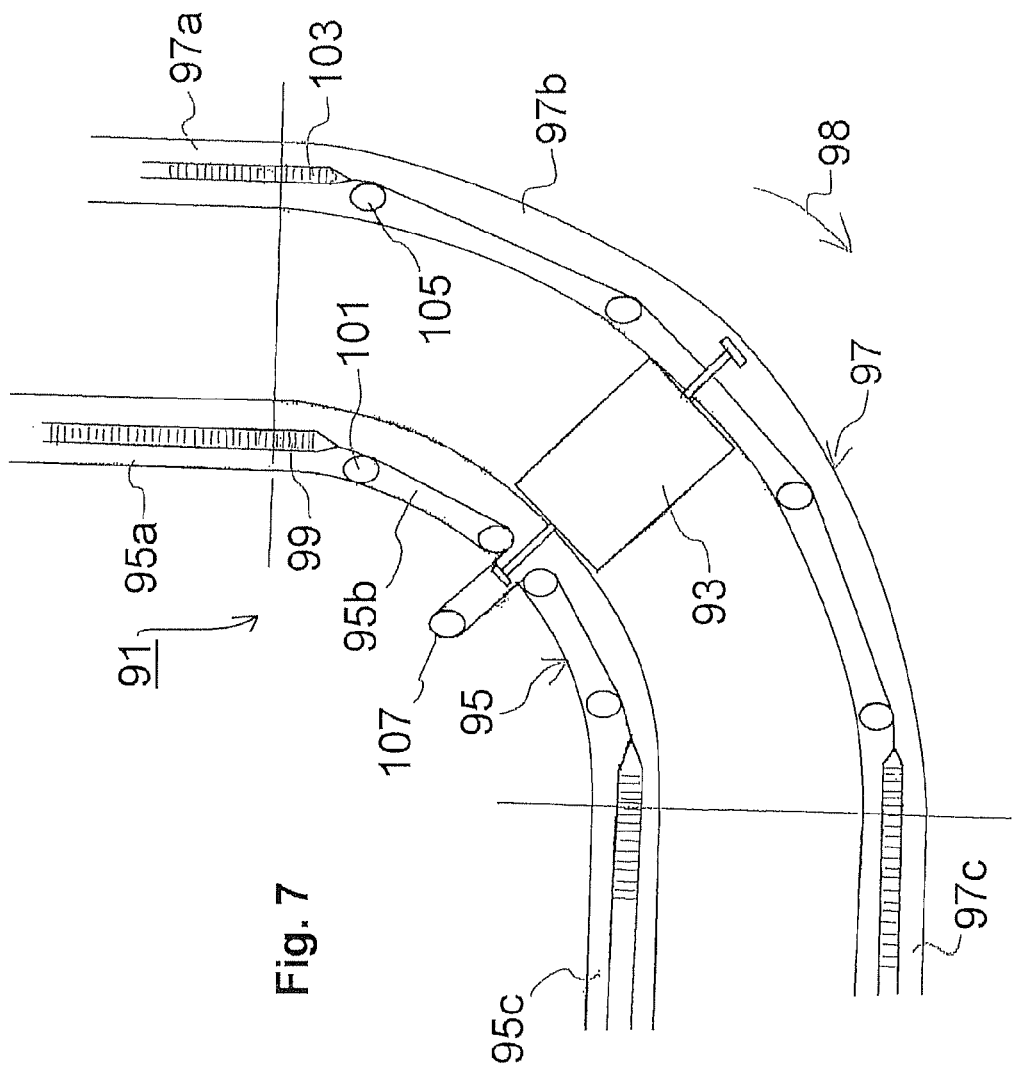
FIG. 7 is a top view of a portion of another embodiment of a conveyor system.
Figure 9:
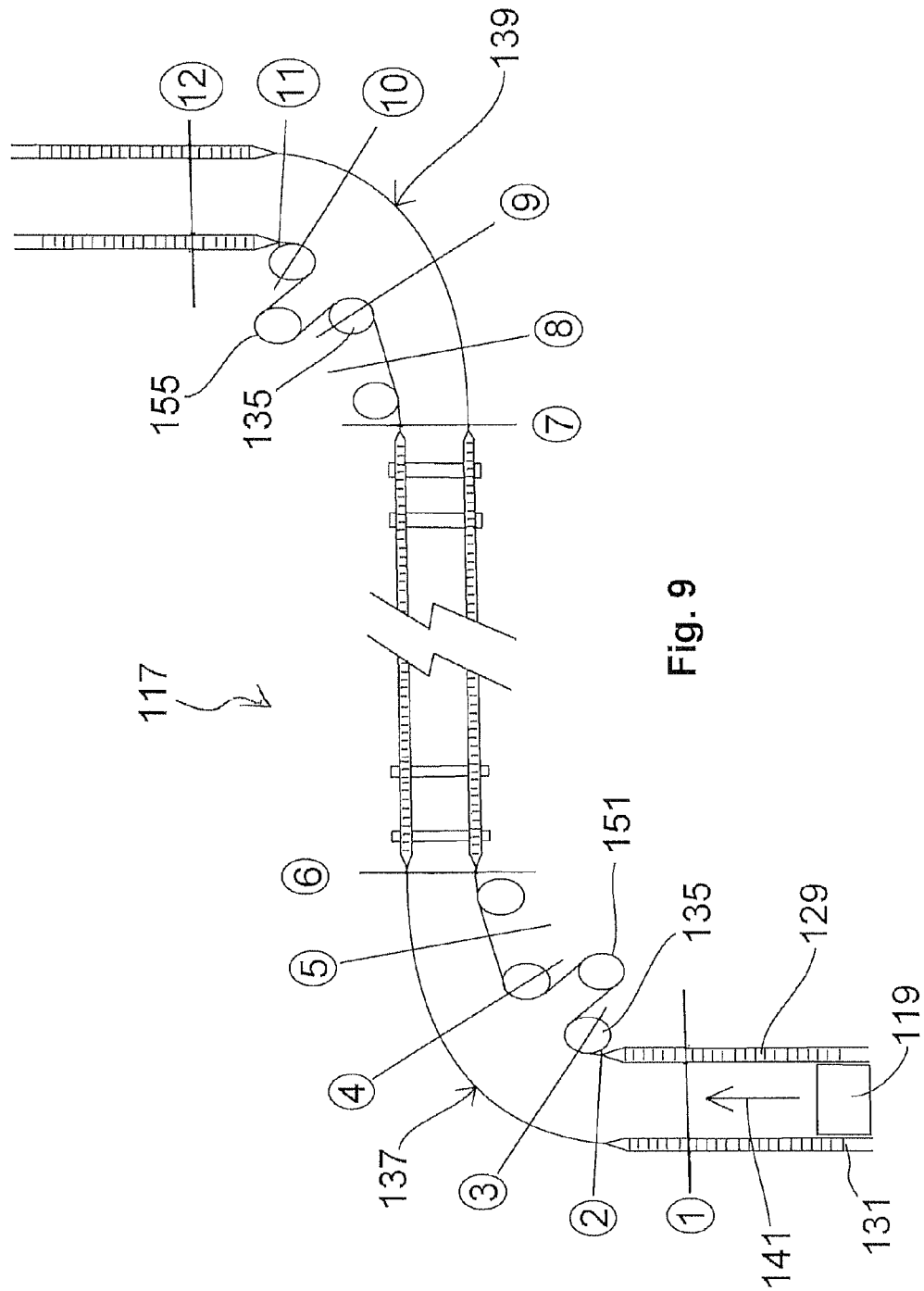
FIG. 9 is a schematic top view of a portion of another embodiment of a conveyor system.

FIG. 7 is a schematic view of an embodiment of a conveyor system in which the wheel tracks of a conveyor system 91 are formed as curves. In the preferred embodiment, the curves are horizontal planar curves, though additional embodiments may allow for helical curves or a combination of types of curves. Box 93 is carried by pairs of upper tracks and lower tracks (not shown), each pair comprising an outside track and an inside track. In the top view shown, only the pair of upper tracks is visible, comprising inside upper track 95 and outside upper track 97. Inside upper track 95 comprises a first straight portion 95a, a curved portion 95b, and a second straight portion 95c. Likewise, outer track 97 comprises a first straight portion 97a, a curved portion 97b, and a second straight portion 97c. The pairs of tracks 95, 97 cooperate to guide box 93 along a curved travel path to the right (as box 93 moves in the direction shown by arrow 98) while maintaining box 93 in a selected angular orientation about horizontal axes passing through box 93.

To propel box 93 along its travel path, an inner tape 99 runs along a tape path that generally coincides with inside track 95, the path being defined by pulleys 101 (only one labeled). In addition, an outer tape 103 runs along a tape path that generally coincides with outside track 97, the path being defined by pulleys 105 (only one labeled). Because the tape path of outer tape 103 through curved portion 97b has a greater length than the tape path of inner tape 99 through curved portion 95b, a take-up loop 107 is formed to make the tape path of inner tape 99 through curved portion 95b equal to that of outer tape 103 through curved portion 97b. This ensures that corresponding portions of tapes 99, 103 simultaneously pass through the travel paths in the pairs of straight portions 95a, 97a and 95c, 97c. To allow for this, inner tape 99 disengages from box 93 as box 93 enters curved portion 95b, passes through the tape path and loop 107, and is reattached to box 93 at the other end of curved portion 95b. As box travels through curved portion 95b, box 93 is propelled only by tape 103, which remains attached to box 93.

For example, FIG. 8 shows a schematic end view of a portion of conveyor system 91, the view being oriented so that the direction of travel shown by arrow 98 (FIG. 7) is into the page. An upper wheel 109 is carried within inside upper track 95, and a pin 111 engages inner tape 99 by extending through a hole in tape 99. This allows the motion of tape 99 to be transferred to box 93 when pin 111 is engaged with tape 99.

Referring also to FIG. 7, while box 93 is in section 95a of track 95, tape 99 is located in position 1 of FIG. 8, wherein tape 99 is engaged with pin 111. As box 93 enters curved section 95b, tape 99 is moved downward to disengage tape 99 from pin 111, which is shown as position 2, and then tape 99 is rotated approximately 90 degrees in the direction shown by arrow 113 to position 3. This rotates tape 99 to a vertical orientation, and tape 99 is guided through the tape path by pulley 101, which rotates on a vertical axis 115. As box 93 moves from curved section 95b to section 95c, tape 99 is rotated back to a horizontal orientation (position 2) and then moved upward to re-engage pin 111 (position 1).

Another embodiment of a conveyor system having curved wheel tracks is shown in the schematic views of FIGS. 9 through 12. As shown, conveyor system 117 is configured for making a right turn and a left turn, though system 117 can be configured with any number of right and left turns or a combination of any number of turns in either direction. Upper wheels 121 and lower wheels 123 are located on each side of box 119, and wheels 121, 123 engage pairs of upper tracks 125 and lower tracks 127, respectively. Two tapes 129, 131 are configured to propel box 119 along the travel path defined by tracks 125, 127, tapes 129, 131 being guided by pulleys 133 having a generally horizontal axis of rotation and by pulleys 135 having a generally vertical axis of rotation. Box 119 is configured to turn right around curve 137 and left around curve 139 when traveling in the direction shown by arrow 141. As with all embodiments shown herein, the movement is reversible to move box in the opposite direction along tracks 125, 127.

In order to illustrate the sequence of steps in manipulating tapes 129, 131 during operation of system 117, the steps are illustrated using position numbers, with corresponding numbers appearing on each of FIGS. 9 through 12. The sequence for turning right around curve 137 is shown for positions 1 through 6, and the sequence for turning left around curve 139 is shown for positions 7 through 12.

Figure 11:
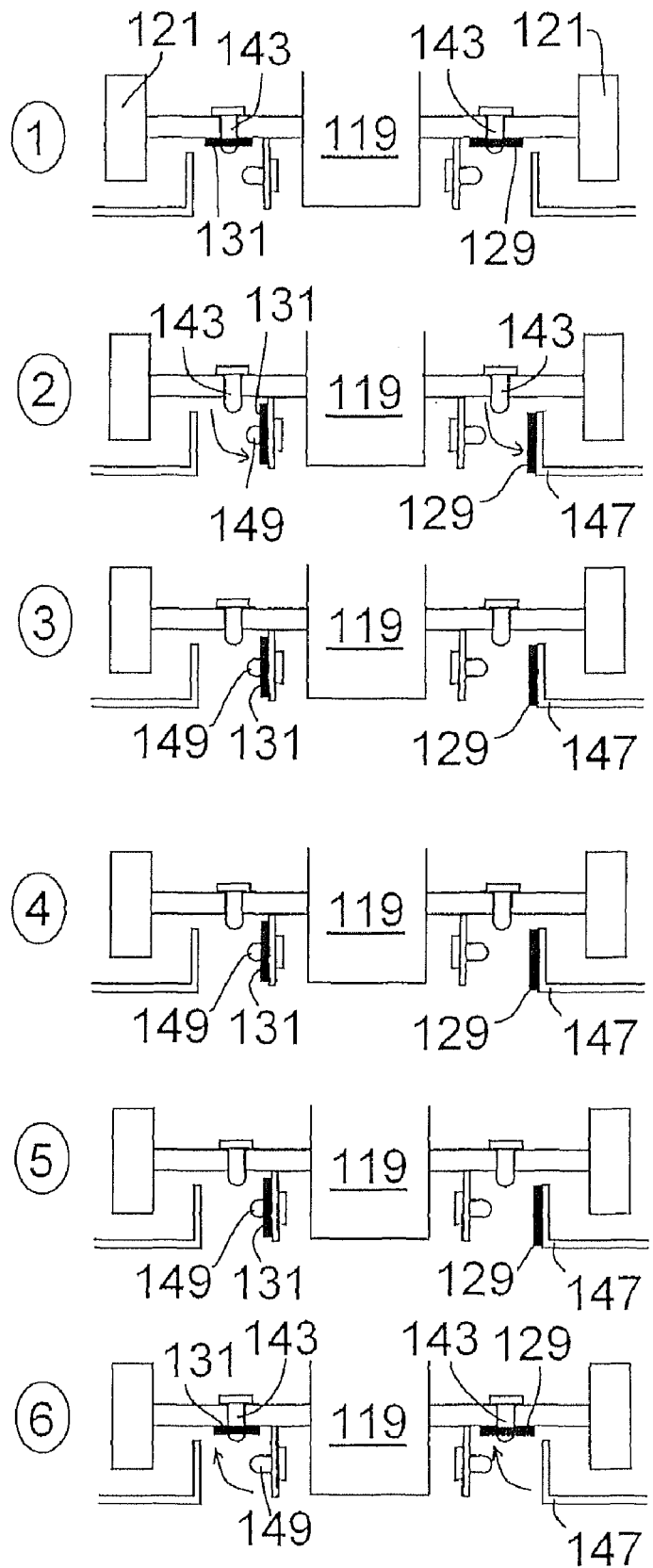
FIG. 11 is a series of schematic end views of the conveyor system of FIG. 10.
Figure 12:
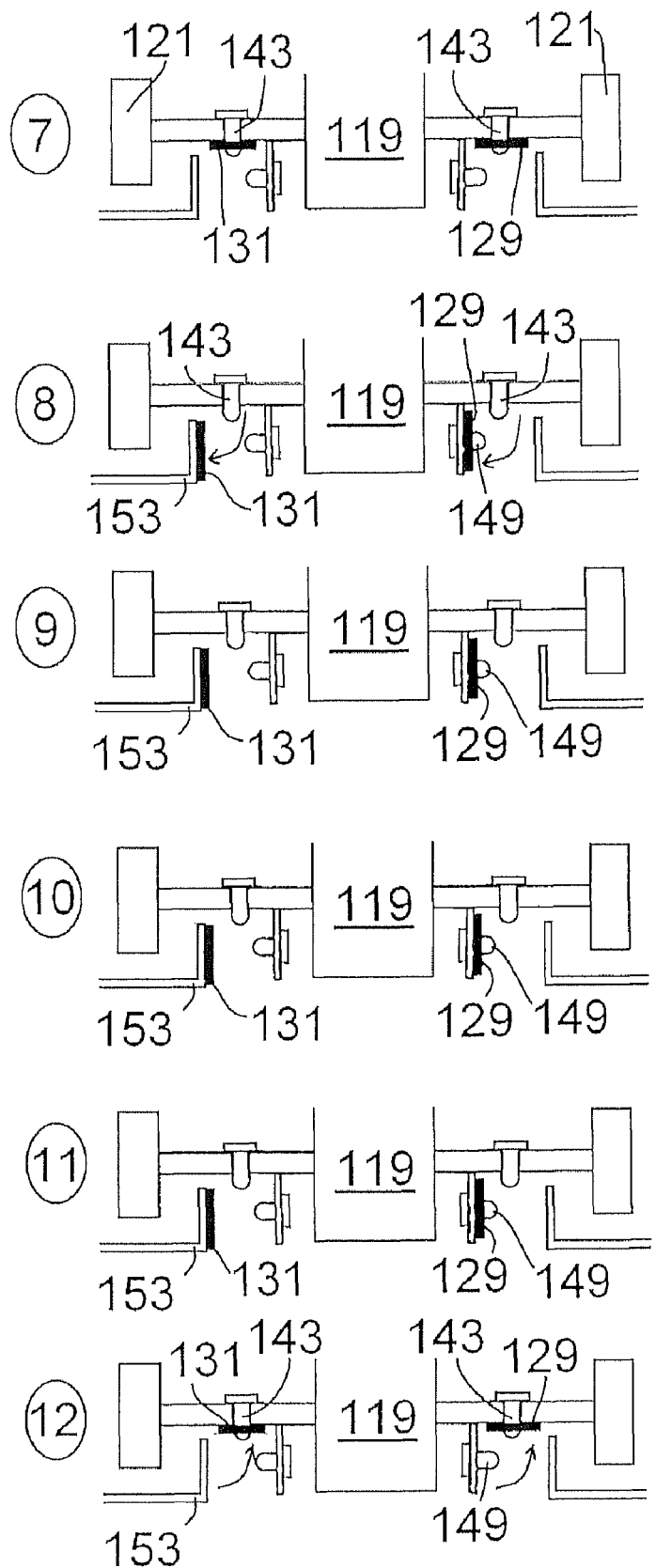
FIG. 12 is a series of schematic end views of the conveyor system of FIG. 10.

Position 1 is located prior to box 119 entering curve 137. As shown at the top of FIG. 11, box 119 has an upper wheel 121 on each side of box 119 and a generally vertical pin 143 located between box 119 and each wheel 121. Each pin 143 is configured for engaging a hole in the corresponding tape 129, 131 for transferring motion of tapes 129, 131 to box 119. Tapes 129, 131 are in a generally horizontal orientation.

In position 2, tapes 129, 131 are lowered using horizontal pulleys 133 to disengage tapes 129, 131 from their corresponding pins 143, and an angled roller 145 is used to begin turning tapes 129, 131 90 degrees to a generally vertical orientation. In curve 137, tape 129 is located on the inside of the curve and engages an inner tape guide 147, which may be a stationary track or a roller. Tape 131 engages a generally horizontal pin 149 attached to box 119 for propelling box 119 through curve 137. This configuration continues through positions 3, 4, and 5 Because of the shorter path for tape 129 through curve 137, a take-up loop 151 is provided.

Between positions 5 and 6, angled rollers 145 begin to rotate tapes 129, 131 back to a horizontal orientation, and tapes 129, 131 disengage from guide 147 and pin 149. In position 6, tapes 129, 131 are moved upward and re-engage pins 143 for propelling box 119.

The sequence of tape manipulations in curve 139 is the mirror image of those in curve 137.

Position 7 is located prior to box 119 entering curve 139. Each pin 143 engages a hole in the corresponding tape 129, 131, which are in a generally horizontal orientation.

In position 8, tapes 129, 131 are lowered using horizontal pulleys 133 to disengage tapes 129, 131 from their corresponding pins 143, and an angled roller 145 is used to begin turning tapes 129, 131 to the generally vertical orientation. In curve 139, tape 131 is located on the inside of the curve and engages an inner tape guide 153, which may be a stationary track or a roller. Tape 129 engages a generally horizontal pin 149 for propelling box 119 through curve 139. This configuration continues through positions 9, 10, and 11 Because of the shorter path for tape 131 through curve 139, a take-up loop 155 is provided.

Between positions 11 and 12, angled rollers 145 begin to rotate tapes 129, 131 back to the horizontal orientation, and tapes 129, 131 disengage from guide 153 and pin 149. In position 12, tapes 129, 131 are moved upward and re-engage pins 143 for propelling box 119.

Figures 13, 14A:
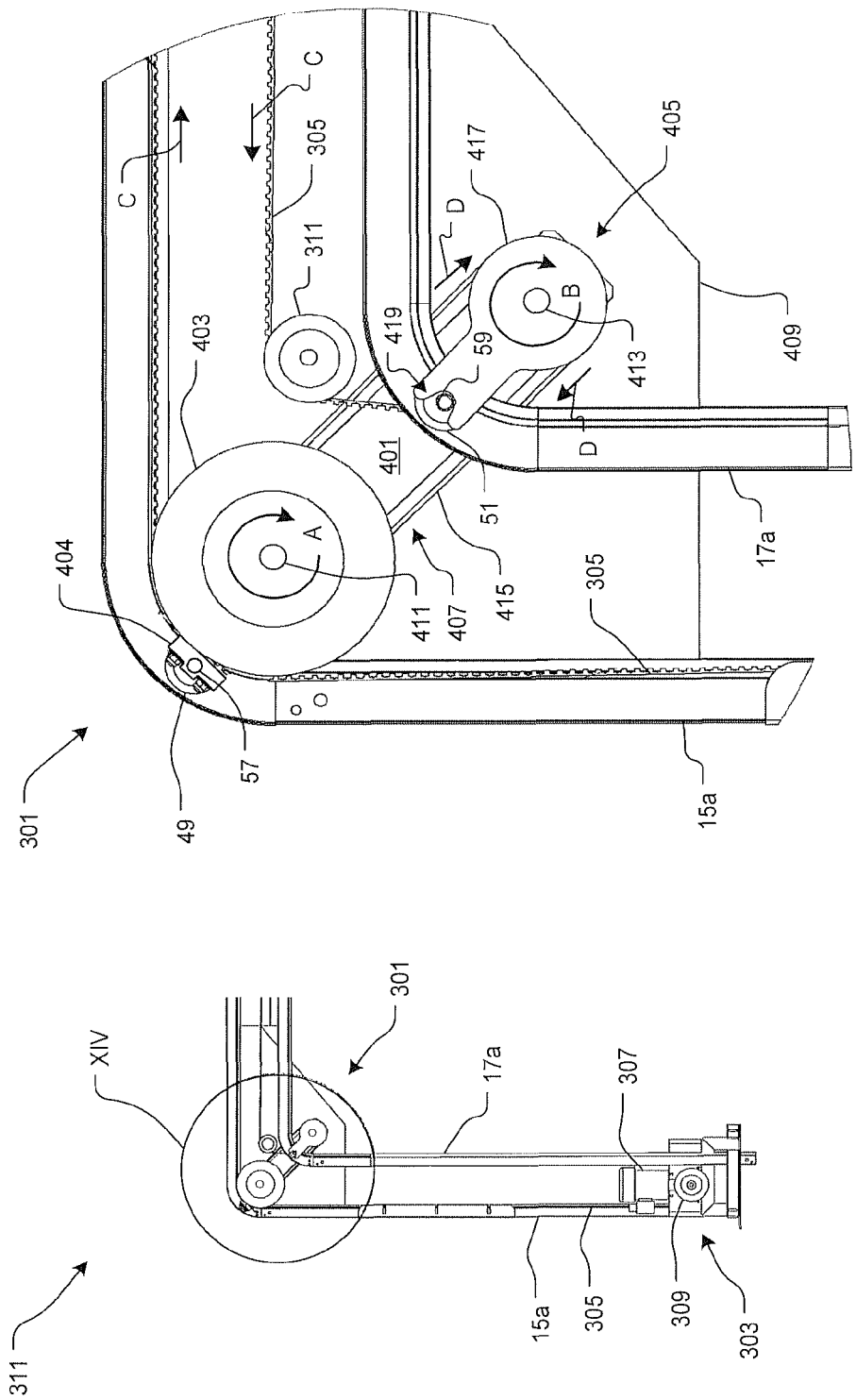
FIG. 13 is a side view of a curved portion of a conveyor system according to an alternative embodiment of the present application.
FIG. 14A is an enlarged side view of a lift subsystem of the conveyor system of FIG. 13 taken at XIV-XIV.

Referring now to FIG. 13 in the drawings, a side view of a curved portion of a conveyor system 311 according to an alternative embodiment of the present application is illustrated. In this embodiment, conveyor system 311 includes a lift subsystem 301 and a drive subsystem 303. Lift subsystem 301 is configured to support the conveyor member (not shown, but similar to box member 13) as the conveyor member transitions from vertical travel to horizontal travel around the curved portion of conveyer system 311. As shown in FIG. 14A, upper wheel 49 and lower wheel 51 of the conveyor member travel on respective tracks 15a, 17a. Upper wheel 49 attaches to an attachment device 404 coupled to a drive belt 305. Around a curve, lower wheel 51 has a propensity to slip, thereby causing the conveyor member to sink an/or move in a reverse direction. This sinking can cause the carried products to fall from the conveyor member, resulting in damage to the product and possible damage to conveyor system 311. Lift subsystem 301 overcomes slippage by coupling lower wheel 51 with an engagement subsystem 405. Lift subsystem 301 ensures that lower wheel 51 continues to travel in the desired direction without reversing or slipping during operation.

FIG. 13 illustrates lift subsystem 301 attached to a curved portion of conveyor system 311. As shown, lift subsystem 301 is configured for lifting and lowering the conveyor member around a right turn. However, it should be appreciated that lift subsystem 301 could also be configured for lifting and lowering the conveyor member around left turns. In addition, lift subsystem 301 could be configured for different curve angles. For example, lift subsystem 301 could be configured to lift the conveyor member around a 45 degree curve. In the preferred embodiment, components of lift subsystem 301 are composed of a metallic material. In alternative embodiments, components of lift subsystem 301 could be composed of plastic, composite, or any other suitable materials.

Conveyor system 311 also includes a drive subsystem 303 for driving lift subsystem 301. Drive subsystem 303 preferably includes a drive motor 307, a motor sprocket 309, a drive belt 305, and a plurality of pulleys 311 (only one is shown). In the preferred embodiment, drive subsystem 303 is positioned below and detached from lift subsystem 301. However, it should be appreciated that alternative embodiments could include drive subsystems that attach directly to lift subsystem 301, thereby eliminating the need for drive belt 305, pulleys 311, and other components of conveyor system 311 associated with drive subsystem 303. In the preferred embodiment, drive motor 307 is a 186 Watt (¼ Horsepower) alternating current motor powered by an external power source (not shown). Alternative embodiments could include larger or smaller sized motors. It will be appreciated that the size of drive motor 307 is determined by the type of load carried by the conveyor member and the amount of power required to pull the conveyor member around the track. In addition, alternative embodiments could include different types of motors, such as direct current motors, hydraulic motors, or any other suitable form of drive mechanism. In addition, alternative power sources may be used to provide power the drive motors, such as, batteries, rechargeable batteries, solar power cells, or other suitable power sources.

In the preferred embodiment, drive belt 305 is a timing belt. Belt 305 is configured for coordinating the rotational movement between a drive member 403 and an actuator subsystem 407. Drive belt 305 is sufficiently tightened around such that slippage does not occur between drive member 403, pulleys 311, drive motor sprocket 309, and drive belt 305. In the preferred embodiment, attachment device 404 is coupled to axle 57 and drive belt 305. It should be understood that attachment device 404 remains attached at the same location on drive belt 305. It should be appreciated that alternative attachment devices could be used in lieu of attachment device 404. For example, an adhesive, snap-on, magnetic, or other suitable device could be used.

Figure 14B:
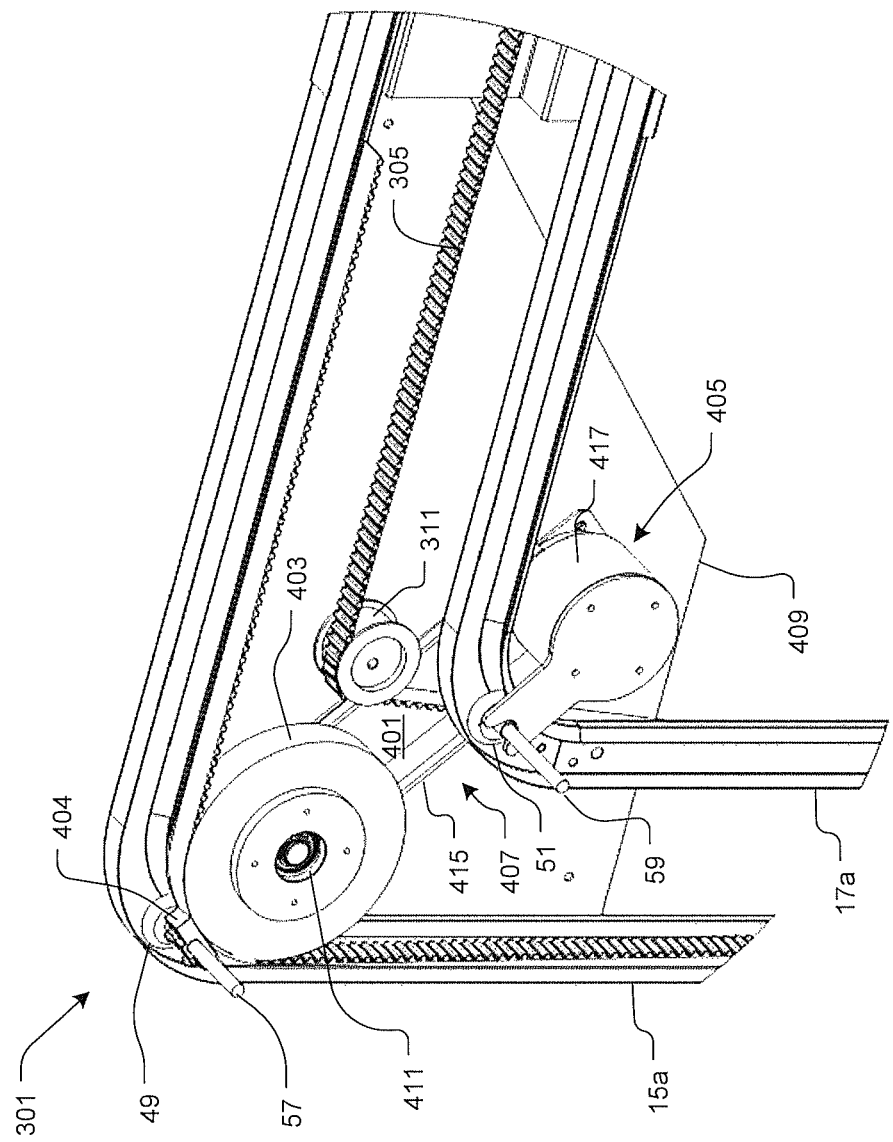
FIG. 14B is an enlarged oblique view of the lift subsystem of FIG. 14A.

Referring now also to FIGS. 14A and 14B in the drawings, enlarged views of lift subsystem 301 taken at XIV of FIG. 13 are illustrated. FIG. 14A is a side view of lift subsystem 301, and FIG. 14B is an oblique view of lift subsystem 301. Lift subsystem 301 includes a support 401, drive member 403 rotatably attached to support 401, an engagement subsystem 405 rotatably attached to support 401, and an actuator subsystem 407 operably associated with drive member 403. An optional support plate 409 attaches directly to tracks 15a, 17a and adds additional rigidity and support to tracks 15a, 17a and lift subsystem 301. In the preferred embodiment, support 401 is attached to support plate 409. In alternative embodiments, support 401 may be attached directly to tracks 15a, 17a.

Drive member 403 and engagement subsystem 405 are preferably rigidly attached to respective shafts 411, 413. Drive member 403 is coupled to a drive sprocket 701 via a drive shaft 411, and engagement subsystem 405 is coupled to a driven sprocket 703 via a driven shaft 413 (see FIG. 17). As explained more fully below, drive sprocket 701 and driven sprocket 703 are coupled together via an actuator belt 415, such that rotation of drive member 403 cause a corresponding rotation of engagement subsystem 405. This rotational movement is shown with arrows A and B on drive member 403 and engagement subsystem 405, respectively. It should be understood that if the direction of travel of conveyor member is reversed, then the rotational movement of engagement subsystem 405 and drive member 403 is also reversed.

Engagement subsystem 405 includes a lever 417 and an engagement device 419. Although engagement device 419 has been shown as an integral portion of lever 417, it should be understood that engagement device 419 may be a separate component from lever 417. Engagement device 419 is configured for coupling with axle 59 of lower wheel 51, preferably in the form a U-shaped slot located at the distal end of lever 417. In the preferred embodiment, lever 417 is composed of a metallic material; however, lever 417 could be composed of plastic, composite, and other suitable materials.

Figure 15:
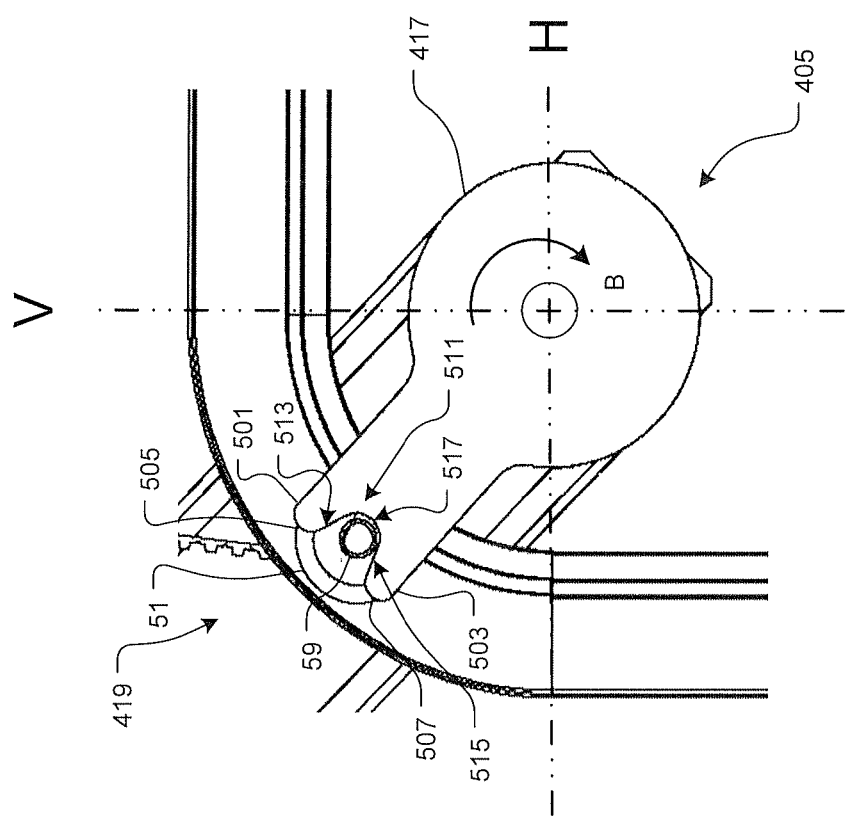

Referring now also to FIG. 15 in the drawings, an enlarged side view of engagement subsystem 405 is illustrated. In FIG. 15, engagement device 419 is shown engaged with lower wheel 51. As shown in FIG. 15, engagement device 419 includes two prongs 501, 503 having respective distal ends 505, 507 that are configured with convex surfaces. Prongs 501, 503 form a slot 511 for receiving axle 59. Slot 511 includes opposing inner side surfaces 513, 515 and inner lower surface 517. It is preferred that side surfaces 513, 515 be configured to taper downwardly and inwardly towards lower surface 517. Side surfaces 513, 515 are sufficiently spaced apart such that axle 59 fits snuggly within slot 511.

The curvature of surfaces 513, 515 also allow a smooth transition during pre-engagement and disengagement between slot 511 and axle 59.

Figure 16:
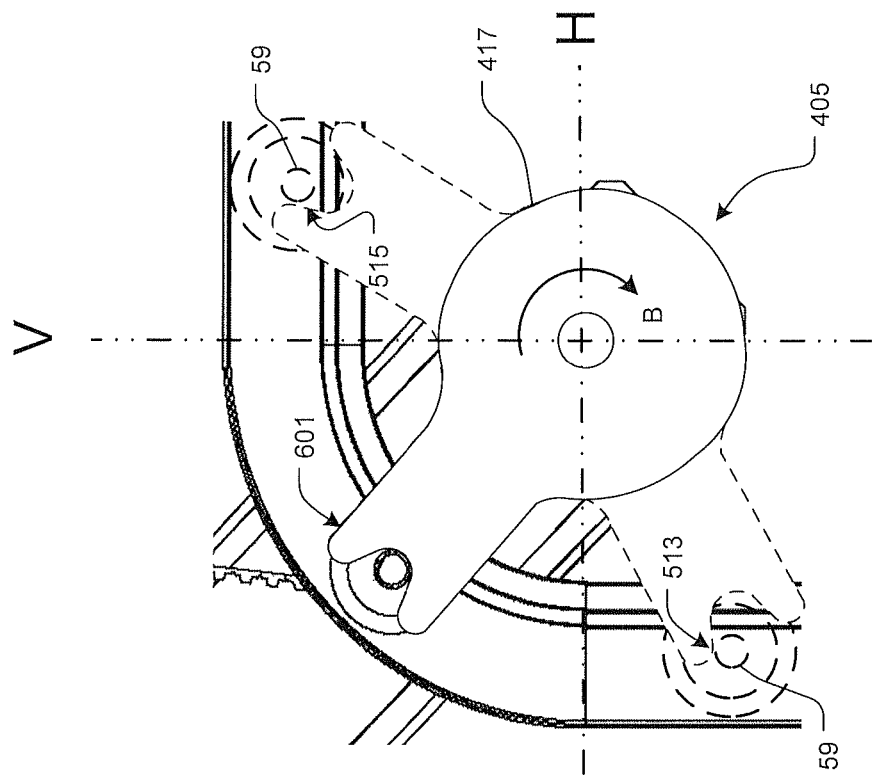
FIGS. 15 and 16 are side views of an engagement subsystem of the lift subsystem of FIG. 14A.

Referring now also to In FIG. 16 in the drawings, the operation of lever 417 and engagement device 419 will be described. As explained below with respect to FIG. 16, lever 417 engages axle 59 at a first "pre-engagement" position and disengages axle 59 at a second "disengagement" position. Lever 417 is operable between the pre-engagement position, which is preferably located about 45 degrees below a horizontal axis H; and the disengagement position, which is located about 45 degrees to the right of a vertical axis V, i.e., about 180 degrees from the pre-engagement position. The pre-engagement position and the disengagement position are represented in FIG. 16 by dashed lines. Horizontal axis H is located at about the start of the curve, while vertical axis V is located at about the end of the curve. It should be understood that horizontal axis H and vertical axis V do not have to be parallel and vertical to the ground surface. In alternative embodiments, the pre-engagement position and the disengagement position may be located at different positions. Such positions are determined by curvature of the rails and the type of engagement device used.

During operation, axle 59 comes into contact with inner side surface 513 at the pre-engagement position, and disengages with inner surface 515 at the disengagement position. During transition from the pre-engagement position to the disengagement position, axle 59 is supported by surface 517. In the preferred embodiment, engagement device 419 is configured to couple with lower wheel 51. However, it should be appreciated that engagement device 419 could be configured to couple with both upper wheel 49 and lower wheel 51. It should be appreciated that engagement device 419 could also be configured to couple with other components of the conveyor member, either alone or in combination with wheels 49 or 51, in lieu of coupling with axle 59. In addition, it is preferred that lever 417 be coupled to one side of the conveyor member; however, it should be appreciated that engagement subsystem 405 could include a lever configured to be coupled to both sides of the conveyor member.

It is preferred that drive member 403 continuously drive engagement subsystem 405 during operation. Drive belt 305 is timed and adjusted, such that lower wheel 51 engages engagement subsystem 405 at the pre-engagement position when drive belt 305 is moving in the direction indicated by arrow C. Likewise, drive belt 305 is timed and adjusted, such that lower wheel 51 engages engagement subsystem 405 at the disengagement position when drive belt 305 is moving in the opposite direction.

In the preferred embodiment, engagement device 419 is a slot designed with a U-shaped configuration. However, it should be appreciated that alternative embodiments could include other suitable shapes and designs for coupling axle 59 with the engagement subsystem 405. For example, the slot could include a V-shape, L-shape, or other suitable shape. In addition, engagement device 419 could be configured with a slot located on surface 601. Alternative embodiments could also incorporate an adhesive, a magnetic, or other similar device for lifting and lowering the conveyor member.

Referring now also to FIG. 17 in the drawings, a front view of actuator subsystem 407 is illustrated. Actuator subsystem 407 provides a means for drive member 403 to rotate engagement subsystem 405. Actuator subsystem 407 includes a drive sprocket 701, a driven sprocket 703, and an actuator belt 415. Drive sprocket 701 and driven sprocket 703 are rigidly coupled to respective shafts 411, 413. Drive member 403 is coupled to drive sprocket 701 by a shaft 411. In a similar fashion, driven sprocket 703 is coupled to engagement subsystem 405 by shaft 413. Actuator belt 415 attaches to both drive sprocket 701 and driven sprocket 703.

Referring now also to FIG. 18 in the drawings, a cross-sectional view of actuator subsystem 407 taken at XVIII-XVIII of FIG. 17 is illustrated. As is shown, drive sprocket 701 has a radius R1, while driven sprocket 703 has a radius R2. In the preferred embodiment, drive member 403 and engagement subsystem 405 rotate at the same rotational speed. As such, radius R1 has the same length as radius R2. Therefore, the preferred embodiment includes a gear ratio of approximately 1:1.

Referring now also to FIG. 19 in the drawings, an alternative embodiment of actuator subsystem 407 is illustrated. As explained, the preferred embodiment of actuator subsystem 407 includes drive sprocket 701, driven sprocket 703, and actuator belt 415. FIG. 19 illustrates an alternative embodiment that could be used in lieu of the preferred gear-sprocket configuration. As shown, a gear system 901 includes a drive gear 903, a driven gear 905, and an idler gear 907. Gears 903, 905, 907 are rotatably attached to support 401 with respective shafts 411, 413, and 909. In addition to the sprocket-belt and gear subsystems, actuator subsystem could include an purely electrical, electrical-mechanical, or other types of systems that coordinates the rotational movement of both drive member 403 and engagement subsystem 405.

The conveyor system embodiments shown herein provide many advantages, including: (1) the ability to maintain a conveyor member in a selected orientation throughout the travel path; (2) the ability to turn left or right; (3) high reliability; and (4) low cost. The lift conveyor system includes a lift subsystem that provides additional advantages, including the ability to assist the conveyor member around a curved portion of the conveyor system, thereby eliminating slippage of the lower wheel.

It should be noted that each of the features shown in a described embodiment may be combined with other appropriate features from other embodiments. It should also be noted that the conveyor systems may be operated in either direction or may be configured as a continuous loop. While pins for engaging tapes or belts are shown as stationary, pins may also be configured to be retractable or otherwise movable relative to the conveyor member. For example, the pins may rotate or slide between positions. It should be noted that "tape," as used herein, is meant to encompass all appropriate types of flexible, belt-like components and is not meant to be limiting.

While this description makes reference to illustrative embodiments, it is not intended to be construed in a limiting sense. Various modifications and other embodiments will be apparent to persons skilled in the art upon reference to the description.

I claim:

1. A lift subsystem for supporting a conveyor member in a conveyor system, the lift subsystem comprising:
   a support member attached to the conveyor system;
   a drive member rotatably attached to the support member;
   a drive subsystem for driving the drive member;
   an engagement subsystem rotatably coupled to the support member for selectively engaging the conveyor member at a pre-engagement position and releasing the conveyor member at a disengagement position; and
   an actuator subsystem operably associated with the drive member and the engagement subsystem;
   wherein the engagement subsystem supports the conveyor member as the conveyor member travels through a curve of the conveyor system, thereby preventing the conveyor member from slipping;
   wherein the pre-engagement position is located on a vertical track section of the conveyor system and the disengagement position is located on a horizontal track section of the conveyor system; and
   wherein the conveyor member remains in constant contact with the vertical, curved, and horizontal track sections of the conveyor system.

2. The lift subsystem according to claim 1, wherein the drive subsystem comprises:
   a motor having a shaft;
   a motor sprocket rigidly coupled to the shaft; and
   a drive belt coupled to the motor sprocket.

3. The lift subsystem according to claim 1, wherein the engagement subsystem comprises:
   a lever; and
   an engagement device attached to the lever.

4. The lift subsystem according to claim 3, wherein the engagement device is configured for coupling with a lower wheel of the conveyor member.

5. The lift subsystem according to claim 3, wherein the engagement device is configured for coupling with opposing sides of the conveyor member.

6. The lift subsystem according to claim 3, wherein the engagement device is operable between a pre-engagement position that is about 45 degrees below a horizontal axis, and a disengagement position that is about 180 degrees from the pre-engagement position.

7. The lift subsystem according to claim 3, wherein the engagement device forms a slot located at a distal end of the lever, the slot comprising:
   a first prong having a first inner side surface; and
   a second prong having a second inner surface, the second inner surface facing the first inner surface;
   wherein the first and the second inner surfaces are configured to taper downwardly and inwardly towards a lower surface; and
   wherein the first inner surface and the second inner surface are sufficiently spaced apart such that an axle of the lower wheel fits snugly within the slot.

8. The lift subsystem according to claim 1, wherein the actuator subsystem comprises:
   a drive sprocket driven by the drive member;
   a driven sprocket attached to the engagement subsystem; and
   an actuator belt for coupling the drive sprocket to the driven sprocket.

9. The lift subsystem according to claim 1, wherein the actuator subsystem comprises:
   a drive gear driven by the drive member;
   a driven gear attached to the engagement subsystem; and
   an idler gear coupled to the drive gear and the driven gear.

10. A method for lifting a conveyor member around a curved portion of a conveyor system, comprising:
    driving an engagement subsystem with a drive subsystem;
    coupling the conveyor member with the engagement system as the conveyor member reaches a pre-engagement position;
    supporting the conveyor member as the conveyor member travels around the curved portion; and
    releasing the conveyor member from the engagement subsystem at a disengagement position;

wherein the engagement subsystem engages the conveyor member, such that the conveyor member does not slip when traveling around the curved portion;

wherein the pre-engagement position is located on a vertical track section of the conveyor system and the disengagement position is located on a horizontal track section of the conveyor system; and wherein the conveyor member remains in constant contact with the vertical, curved, and horizontal track sections of the conveyor system.

11. The method according to claim 10, wherein the step of coupling the conveyor member is achieved by providing a lever having an engagement device that engages a lower wheel of the conveyor member as the conveyor member travels around the curve.

12. The method according to claim 10, wherein the engagement device is a slot positioned at a distal end of the engagement device, the slot comprising:

a first prong having a first inner side surface; and a second prong having a second inner surface, the second inner surface facing the first inner surface;

wherein the first and the second inner surfaces are configured to taper downwardly and inwardly towards a lower surface; and wherein the first inner surface and the second inner surface are sufficiently spaced apart such that an axle of the lower wheel fits snugly within the slot.

13. The method according to claim 10, further comprising:

engaging the lower wheel with the engagement subsystem at a pre-engagement position that is about 45 degrees below a horizontal axis; and disengaging the lower wheel from the engagement subsystem at a disengagement position that is about 180 degrees away from the pre-engagement position;

wherein the horizontal axis is at the start of a curved portion of the conveyor system, the end of the curved portion is about 90 degrees away from the horizontal axis.

* * * * *